United States Patent [19]
Marlier

[11] Patent Number: 5,186,060
[45] Date of Patent: Feb. 16, 1993

[54] DEVICE FOR MEASURING BELT TENSION

[75] Inventor: Jean-Pierre Marlier, Nice, France

[73] Assignee: Sud Est Electro Mecanique S.E.E.M. (Sarl), La Gaude, France

[21] Appl. No.: 728,727

[22] Filed: Jul. 11, 1991

[30] Foreign Application Priority Data

Jul. 11, 1990 [FR] France .................. 90 09009

[51] Int. Cl.$^5$ ................................. G01L 5/04
[52] U.S. Cl. .................. 73/862.474; 73/862.42
[58] Field of Search .......... 73/862.45, 862.47, 862.48, 73/862.23, 730; 33/815

[56] References Cited

U.S. PATENT DOCUMENTS 4,846,000  7/1989  Steinseifer .................. 73/862.47

FOREIGN PATENT DOCUMENTS 2637372  10/1988  France .
0222736  11/1985  Japan .................. 73/862.48
0645042   1/1979  U.S.S.R. .................. 73/862.45

Primary Examiner—Michael T. Razavi
Assistant Examiner—Elizabeth L. Shopbell
Attorney, Agent, or Firm—Young & Thompson

[57] ABSTRACT

A device for measuring the tension of a belt, which establishes three points of contact on the belt spaced lengthwise on the belt. A middle of the three contact points is a point of contact including a strain gauge. Two other points of contact are on an opposite side of the belt. The two other points of contact are moved toward the belt thereby to press the belt against the point of contact of the strain gauge. This is done with a manually rotatable button, whose possible torque is limited so as to limit the pressure by which the other two points of contact press against the belt. The button is in two parts rotatable relative to each other. The two parts are interconnected by balls disposed partly in one part and partly in a second part so that, with the balls in that position, the two parts rotate together. Springs urge the balls toward that position; but upon a predetermined torque being exceeded, the springs are not strong enough to hold the balls in that position, whereupon the parts can turn relative to each other.

3 Claims, 5 Drawing Sheets

DEVICE FOR MEASURING BELT TENSION

The invention has for its object a device for measuring and controlling the tension of a belt using a constant deformation with measurement of the force exerted on a means serving as a strain gauge, the screw head of the pushbutton being provided with a torque limiter.

The state of the art can be defined by the following patents:

FR-A-2.617.282: "device for measuring and controlling the tension of a belt using constant deformation with measurement of the force exerted on a means serving as a strain gauge".

The device is comprised of a housing chassis on which is mounted a press which applies a constant deformation to the support of the strain gauge, said support is mounted pivotally about an axis and is in contact, in part, with the press and, on the other hand on the surface of the belt, said belt to be measured being maintained in a triangle between the point of contact with the support of said gauge on one face and two rollers on the other face, said strain gauge is connected electrically to a microprocessor.

FR-A-2.637.372: "device for measuring and controlling the tension of a belt using a constant deformation with measurement of the force exerted on means serving as a strain gauge".

It uses a housing chassis on which is obtained a constant deformation with measurement of the force exerted on a strain gauge; the point of contact of the mechanism of the strain gauge is disposed on the same surface of the belt as two rollers or fixed references; said point of contact of the mechanism of the strain gauge is disposed between two rollers; the measurement or the control of the tension is effected by three points of contact comprising two rollers or fixed references and the point of contact of the mechanization means of the constraint; the two rollers are located on the same surface of the belt, on the other surface of the belt, two presser fingers come opposite the two rollers.

Other more remote patents can be cited:
U.S. Pat. No. A-3,653,258
WO-A-8.601 596
U.S. Pat. No. A-3,381,527
U.S. Pat. No. A-4,287,759

According to the patent described above, the press should act with constant deformation on the support of the strain gauge which is mounted pivotally on an axle and which is in contact, on the one hand with the press and, on the other hand with the strain gauge. Moreover, according to the gripping couple applied by the button of the press, the couple may be insufficient. When the couple is insufficient:

the belt is not flattened on the reference legs.
the bend obtained is less than the desired bend.
measurement is erroneous.

To this end, the device according to the invention is provided with a torque limiter adjustable at the level of the screw head of the pushbutton.

The device uses five contact points: three reference points are located on the same side of the belt, the point of contact of the mechanism of the strain gauge and two fixed reference members; said point of contact of the mechanism of the strain gauge is disposed between the two fixed members, on the other surface of the belt, two pressure fingers come opposite the fixed members so as to position said belt on the measurement points.

Constant pressure is applied by the press and its two pressure fingers because it is mounted slidably on the body of the device and is actuated by a button for controlling the press, said button is provided with a torque limiter. Said torque limiter is adjusted at the factory.

The torque limiter of the pressure regulating button is disposed between the body of the button and the rod. The body of the button comprises two recesses which each receive a spring, the opening of these recesses confronting a plate, mounted coaxially with the axis of the button and which is provided with two recesses which are provided for balls, and this in such a way that the balls will engage to an equal extent in the recesses of the button and those of the plate. This engagement of the balls results in the integration of the button and the plate which is secured to the screw-threaded axle of the button. These recesses provided in the plate have an inclined plane which, when the button is in rotation and the force of the springs is not sufficient relative to the torque exerted on the button, permits said balls to leave the recesses of the plate and to uncouple in this way the button from the plate. The button is thus uncoupled and turns freely.

An adjustment screw provided between the button and the plate permits adjusting the gripping force between the two pieces and thus as a function of the force of the springs. The accompanying drawings are given by way of non-limiting examples. They show a preferred embodiment according to the invention, they will permit easy understanding of the invention.

FIG. 1 is an exploded perspective view of the device for measuring and controlling the tension of a belt showing the different members which constitute it, in particular, the rear closure plate, the body of the device, the press, the support of the strain gauge, which is an eccentric member and which supports the tongue of the point of contact of the strain gauge, finally the adjustment screw, secured to the casing, which permits adjusting the height of the point of contact of the strain gauge (bend imposed on the belt).

The device according to the invention uses five contact points, the points 1, 2, 3, 4, 5: three reference points are located on the same side of the belt, the point of contact of the mechanism of the strain gauge is the point of contact 3. Two rollers or fixed references 1 and 2 are disposed on the body 6 of the casing of the device. The point of contact 3 of the mechanism of the strain gauge is disposed between these two references 1 and 2.

Figure 1:
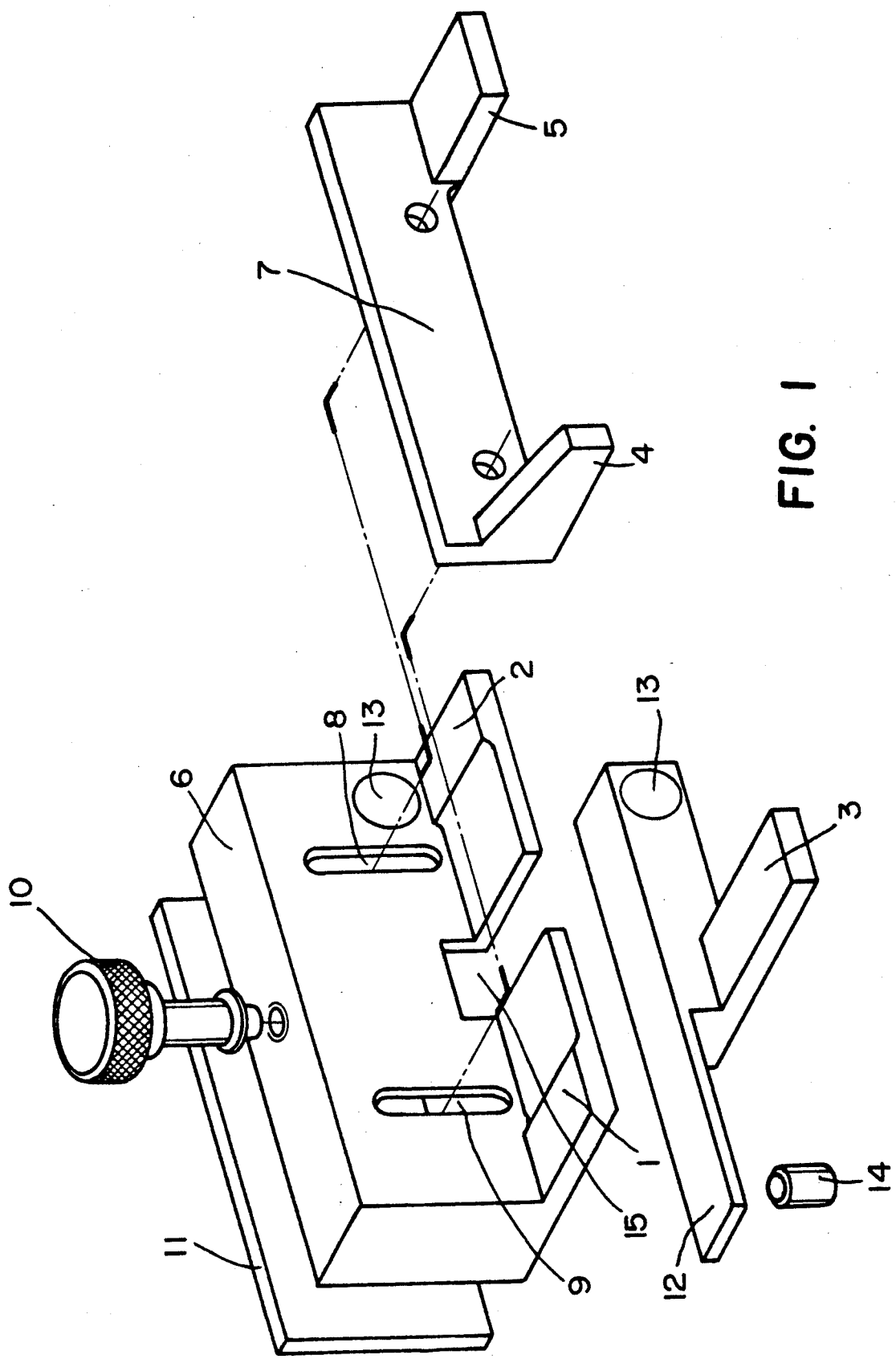
Figure 2:
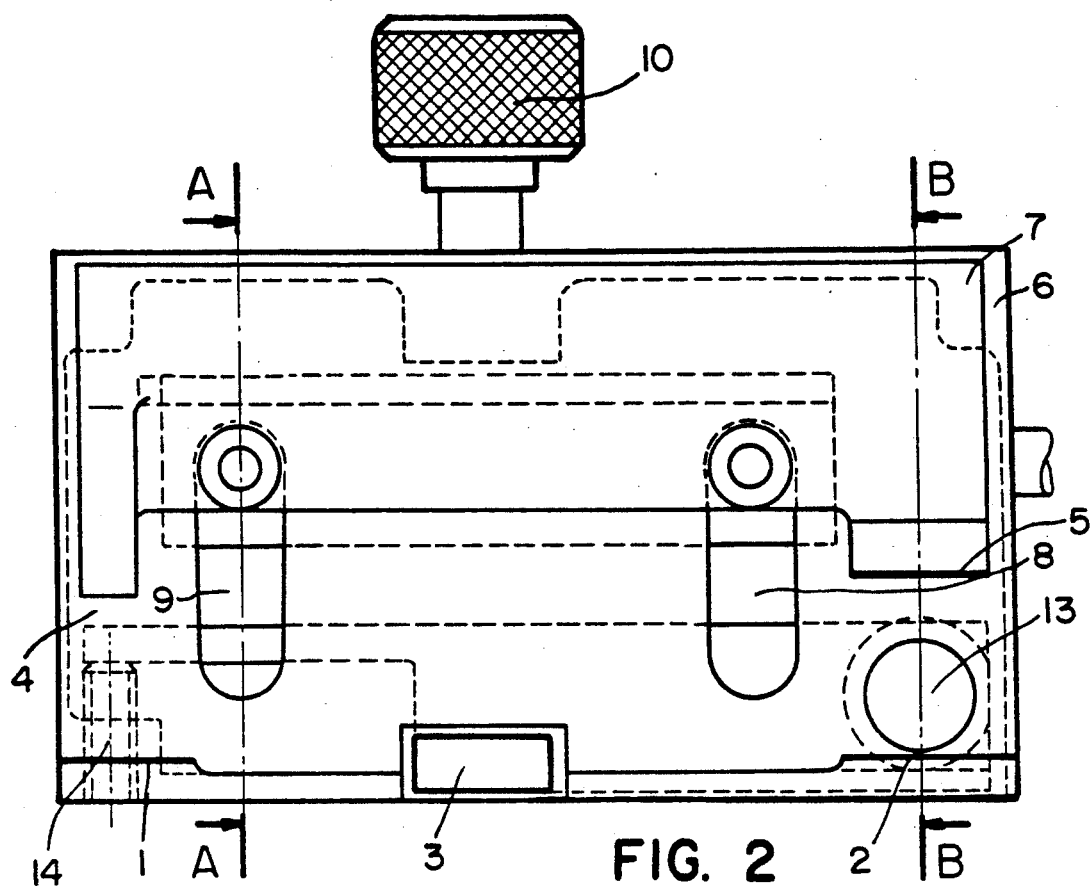
FIG. 2 is a side view of the device, on the side in which the belt is introduced to measure or control its tension.
Figure 3:
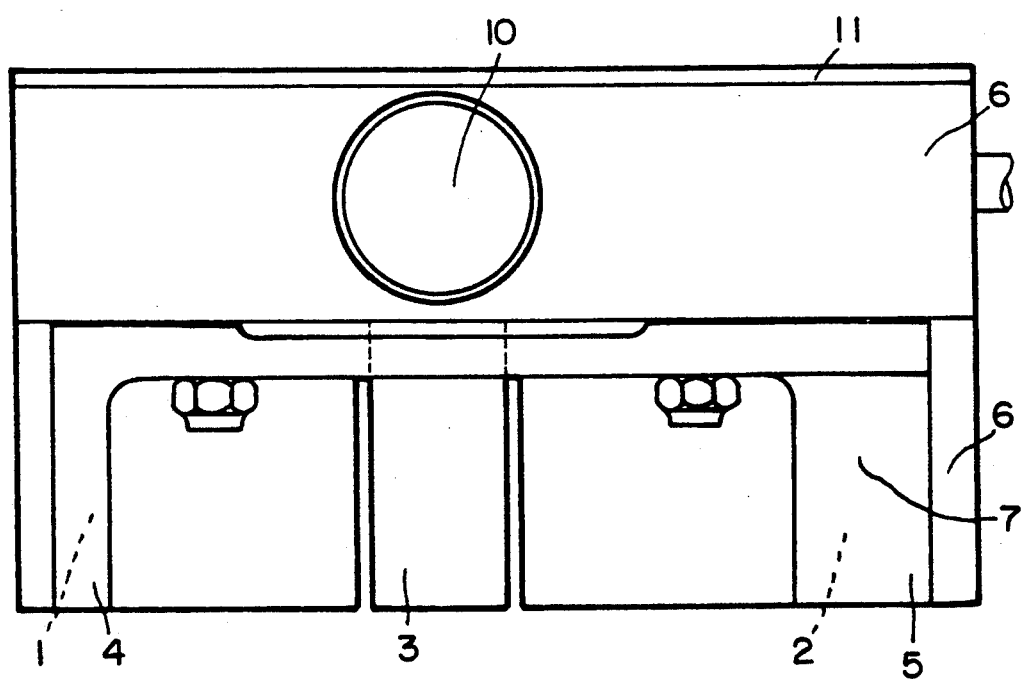
FIG. 3 is a view of the device from above.

On the other surface of the belt, two pressure fingers 4, 5 are disposed opposite the references 1, 2 so as to position said belt on the point of measurement. It is to be noted that the two pressure fingers are mounted on a press 7 and secured by screws in oblong holes 8, 9. This press can be actuated by the adjustment button 10. The body 6 of the casing of the device can be closed in its rear portion by a rear closure plate 11. The point of contact of the strain gauge is maintained by a support 12 of the mechanism of the strain gauge which is an eccentric member, whose axis 13 is eccentric relative to the assembly of the piece which comprises a wing perpendicular to the longitudinal axis of the support piece 12. This wing leaves the casing by a window 15 to come between the references 1 and 2 so as to form a third contact on one of the surfaces of the belt. Confronting an end of a wing formed by the support 12, there is an adjustment screw 14. This adjustment screw 14 is secured to the body 6 of the casing of the device. This adjustment screw is in abutment at its end on the end of the wing of support 12, pivoting about the axis 13 of the mechanism of the strain gauge. This adjustment screw 14 permits adjusting the height of the point of contact 3 of the strain gauge. Of course, said strain gauge is connected electrically to a microprocessor integrated in another display housing with luminescent diodes separated from the receiver housing and is connected to the latter by an electric cord. In FIGS. 2 and 3, there are seen the different points of contact, 1, 2, 3 on one surface of the belt, 4 and 5 on the other surface. The points of contact 4 and 5 are two pressure fingers projecting from the press 7. The points of contact 1 and 2 are rollers or pressure abutments integral with body 6 of the casing. Between these two points of contact 1 and 2, are located the point of contact 3 of the strain gauge. This point of contact is mounted perpendicular to the longitudinal axis of the support, which is mounted within the body 6 of the casing, on a support 12 mounted eccentrically on its axis 13, which permits it to pivot and to be adjusted by the adjustment screw 14.

Figure 4:
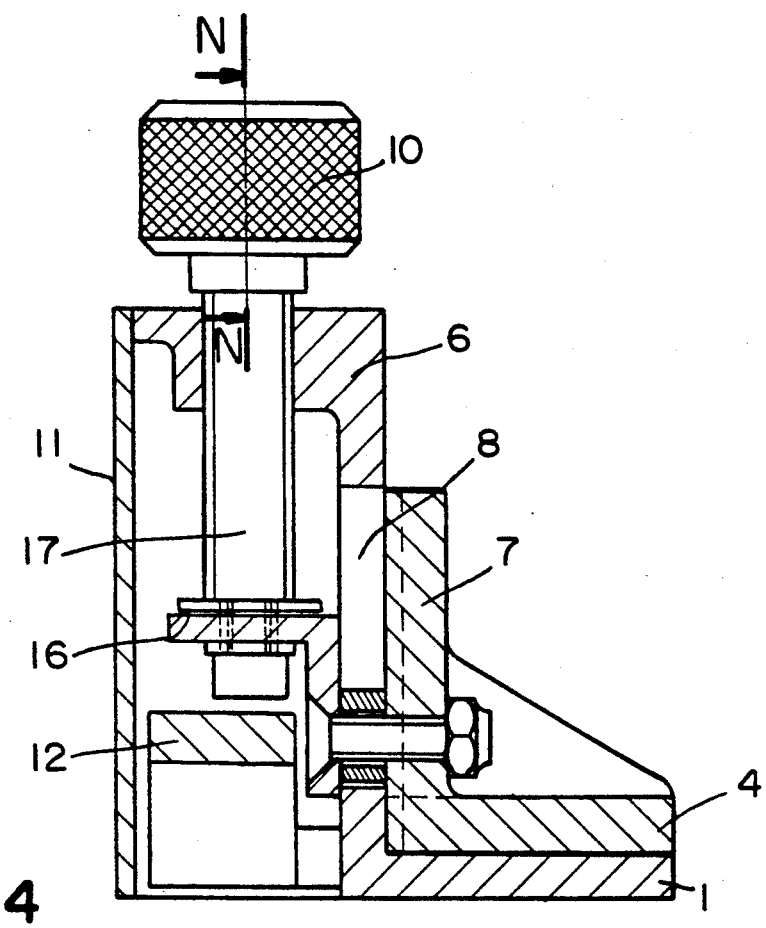
FIG. 4 is a cross section on line A—A shown in FIG. 2.
Figure 5:
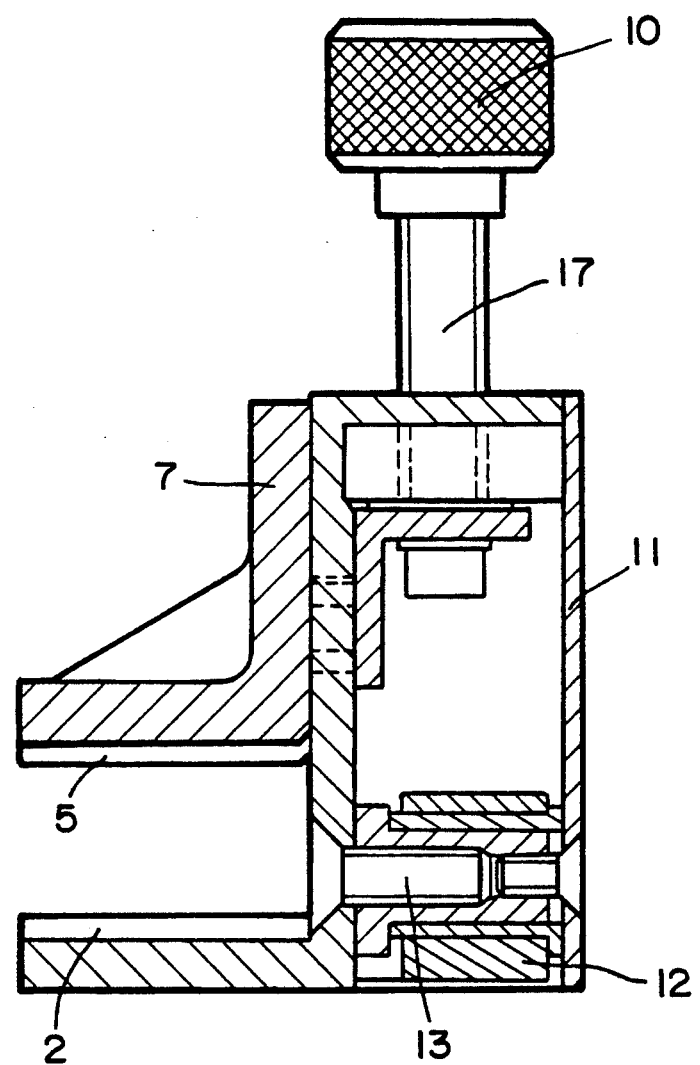
FIG. 5 is a cross sectional view on the device on the line B—B shown in FIG. 2.

FIG. 4 shows the body of casing 6, the rear closure plate 11, the adjustment button 10. This adjustment button 10 is secured to the press 7 by screws which attach to an L-shaped member 16 which integrates the axle 17 of the manipulable button 10 with the screws which pass through the press 7. Within the body 6 of the casing, can be seen the support 12 of the strain gauge. In this FIG. 4, the points of contact 4 and 1 are in contact. By contrast, in FIG. 5, which is a cross-sectional view on the line B—B of FIG. 2, it can be seen that thanks to the adjustment button, the press 7 has been raised on the casing because it slides in the oblong holes 8, 9 and the contact points 5 and 2 are not in contact. There will be noted on this figure the securement screw and the axis 13 of the support 12 of the strain gauge.

Figure 6:
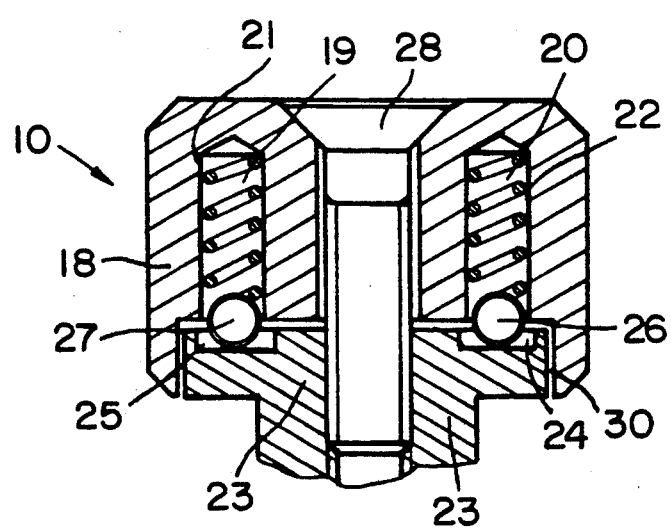
FIG. 6 is a cross sectional view of the adjustment button of the pressure which can be exerted on the press, viewed in section on the line N—N shown in FIG. 4.

FIG. 6 is a cross-sectional view of the end of the adjustment button 10 showing the torque limiter.

In this FIG. 6, the torque limiter is disposed within the adjustment button 10. In the body 18 of the adjustment button 10, are provided two recesses 19 and 20 in which are disposed springs 21 and 22.

Facing the opening of these two recesses, is provided a plate 23 which also has recesses 24 and 25 in which are received balls 26 and 27. The depth of these recesses, the pressure of the springs are provided such that the balls are located partially in recesses 19 and 20 of body 18 of adjustment button 10 and equally within the recesses 25 and 24 of the plate 23. This engagement of the balls 26 and 27 permits rendering integral the adjustment button 10 with its external surface knurled to improve the grip, which is integral with the screw threaded axle 17 which permits raising or lowering the press 7. This plate 23 is mounted coaxially to the axle 17 within a recess 30 provided for this purpose under the lower surface of the adjustment button 10. This plate is maintained in place against the lower surface of adjustment button 10 by a screw 28. This screw 28 ensures the securement of the plate and of the adjustment button, but it also permits adjusting the pressure of the springs against the balls. It therefore permits adjusting and calibrating the action of the torque limiter.

FIGS. 7, 8, 9, 10 and 11 show the action of this torque limiter.

Figure 8:
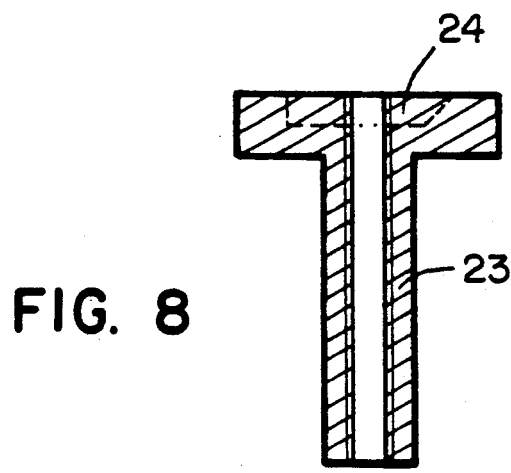
FIG. 8 is a cross-sectional view on the line D—D of this plate.

FIG. 8 is a longitudinal cross-sectional view of the plate 23 which is of T-shape. This plate 23 comprises at least two recesses 24, 25; each recess comprises, on one of its surfaces, an inclined plane 29 which permits, when the torque exerted on the adjustment button 10 is greater than the force exerted by the springs to maintain the balls in their recess, the balls to rise along the inclined plane and thereby decouple the adjustment button 10 and the plate 23. The adjustment button then turns freely.

Figure 9:
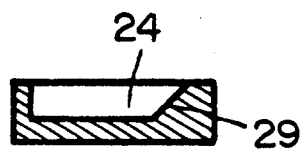
FIG. 9 is a cross-sectional view on section C—C shown in FIG. 7.
Figure 7:
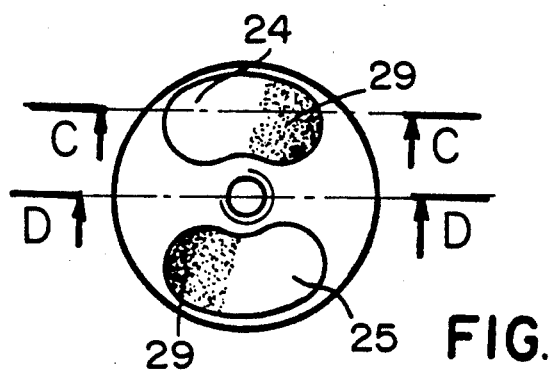
FIG. 7 is a plan view of the plates separated from the adjustment button.

FIGS. 9 and 7 show the two recesses 24 and 25 of the plate 23, and the inclined planes 29.

Figure 10:
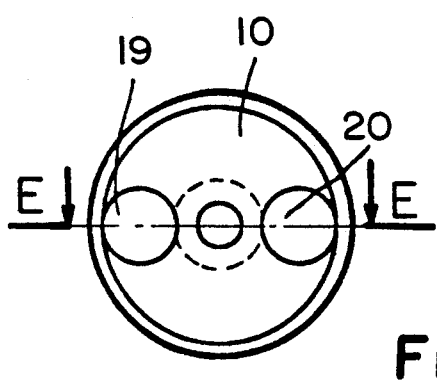
FIG. 10 is a view from below of the surface of the adjustment button which faces the plate. It shows the two recesses in which are disposed the springs for bearing on the walls.
Figure 11:
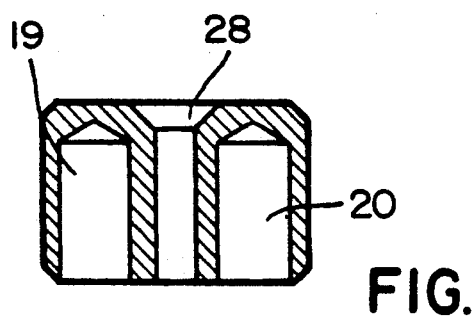
FIG. 11 is a cross-sectional view of this same piece of adjustment button, viewed in section on the line E—E shown in FIG. 10.

FIG. 10 is a view from below of the adjustment button showing the two recesses 19 and 20 which receive the springs 21 and 22.

I claim:

1. A device for measuring the tension of a belt, comprising means establishing three points of contact on the belt spaced lengthwise along the belt, a middle of said three contact points comprising a point of contact on a first side of the belt, including strain gauge, means defining two other points of contact on a second and opposite side of the belt, means for moving said two other points of contact toward the belt thereby to press the belt against said point of contact with said strain gauge, said moving means comprising a manually rotatable button, and means to limit the torque applied by said rotatable button thereby to limit the pressure by which said other two points of contact press against a said belt, said button being in two parts comprising a first and a second part rotatable relative to each other, and said torque limiting means preventing rotation of said two parts relative to each other below a predetermined torque and permitting rotation of said two parts relative to each other above said predetermined torque.

2. A device as claimed in claim 1, wherein said two parts of said button are interconnected by balls disposed partly in the first of said parts of said button and partly in the second of said parts of said button, and spring means acting on said balls to permit said balls to leave the second of said parts of said button upon achievement of said predetermined torque.

3. A device as claimed in claim 2, wherein said spring means comprise compression spring means disposed in the first of said parts of said button and the second of said parts of said button has inclined planes on which said balls ride so as to leave said second of said parts of said button upon achievement of said predetermined torque.

* * * * *